United States Patent
Delker et al.

(10) Patent No.: US 10,057,882 B1
(45) Date of Patent: Aug. 21, 2018

(54) SYSTEM AND METHOD OF DETERMINATION OF WIRELESS COMMUNICATION SERVICE SUBSCRIBER LOCATION BASED ON USER EQUIPMENT SELF-IDENTIFYING TO A WIFI ACCESS POINT WITHOUT ESTABLISHING A DATA SESSION

(71) Applicant: Sprint Communications Company L.P., Overland Park, KS (US)

(72) Inventors: Jason R. Delker, Olathe, KS (US); Matthew Habiger, Kansas City, KS (US); Wayne William Schroeder, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 21 days.

(21) Appl. No.: 15/139,296

(22) Filed: Apr. 26, 2016

(51) Int. Cl.

| | | |
|---|---|---|
| *H04W 16/26* | (2009.01) | |
| *H04W 68/12* | (2009.01) | |
| *H04W 4/00* | (2018.01) | |
| *H04M 1/725* | (2006.01) | |
| *H04W 4/02* | (2018.01) | |
| *H04W 4/04* | (2009.01) | |
| *H04L 29/12* | (2006.01) | |
| *H04W 4/029* | (2018.01) | |
| *H04W 4/60* | (2018.01) | |
| *H04W 4/80* | (2018.01) | |

(Continued)

(52) U.S. Cl.
CPC ........... *H04W 68/12* (2013.01); *H04L 61/605* (2013.01); *H04L 61/6022* (2013.01); *H04M 1/72597* (2013.01); *H04W 4/003* (2013.01); *H04W 4/008* (2013.01); *H04W 4/028* (2013.01); *H04W 4/029* (2018.02); *H04W 4/04* (2013.01); *H04W 4/60* (2018.02); *H04W 4/80* (2018.02); *H04W 84/12* (2013.01); *H04W 88/08* (2013.01)

(58) Field of Classification Search
CPC ....... H04W 68/12; H04W 4/08; H04W 4/028; H04W 16/26; H04W 24/02; H04W 24/10; H04L 61/6022; H04L 61/605
USPC ............ 455/412.1–2, 414.2, 3.01–2, 41.1–2, 455/422.1, 426.1, 446, 456.1, 456.6, 457, 455/552.1, 561, 562.1, 569.1
See application file for complete search history.

(56) References Cited

U.S. PATENT DOCUMENTS

| | | | |
|---|---|---|---|
| 8,953,620 B2 * | 2/2015 | Caldwell ............... | H04M 15/00 370/401 |
| 9,084,013 B1 * | 7/2015 | Arini ................. | H04N 21/44204 |
| 9,727,867 B2 * | 8/2017 | Hefetz ............... | G06Q 20/4014 |

(Continued)

*Primary Examiner* — Cong Tran

(57) ABSTRACT

A method of determining location of a wireless communication service subscriber based on a user equipment (UE) self-identifying to a WiFi access point (AP) without establishing a data session between the UE and the WiFi AP. The method comprises receiving an identity of a UE by a WiFi AP, transmitting a first message comprising the identity of the UE and an identity of a store where the WiFi AP is located by the WiFi AP to a server. The method further comprises looking up by the server a communication address of the UE and a link to a web application associated with the store, building a second message comprising to link to the web application by the server, and transmitting the second message by the server to the UE via a cellular wireless communication link, whereby the UE is enabled to execute the web application.

4 Claims, 8 Drawing Sheets

(51) Int. Cl.
*H04W 84/12* (2009.01)
*H04W 88/08* (2009.01)

(56) References Cited

U.S. PATENT DOCUMENTS

| | | | | |
|---|---|---|---|---|
| 2011/0151891 | A1* | 6/2011 | Edwards | G01S 5/14 455/456.2 |
| 2013/0281084 | A1* | 10/2013 | Batada | H04W 4/008 455/426.1 |
| 2014/0378127 | A1* | 12/2014 | Garnett | H04W 52/247 455/426.1 |
| 2015/0356289 | A1* | 12/2015 | Brown | G06F 21/44 726/7 |
| 2016/0165511 | A1* | 6/2016 | Hedberg | H04W 36/0055 370/331 |
| 2016/0182931 | A9* | 6/2016 | Setos | H04N 21/25816 725/25 |
| 2016/0314517 | A1* | 10/2016 | Ogilvy | G06Q 20/12 |

* cited by examiner

SYSTEM AND METHOD OF DETERMINATION OF WIRELESS COMMUNICATION SERVICE SUBSCRIBER LOCATION BASED ON USER EQUIPMENT SELF-IDENTIFYING TO A WIFI ACCESS POINT WITHOUT ESTABLISHING A DATA SESSION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices have become ubiquitous in the United States. Mobile applications may be installed on mobile communication devices after they have been shipped from original equipment manufacturer (OEM) factories and delivered to users. These mobile applications may be referred to as third party applications and/or user applications. Mobile applications may be installed on a device and remain idle or dormant, executing in the background of the device until selected for foreground execution by the user or when triggered to execute in the foreground by some event.

In some cases, a mobile communication device user may interact with an application via a web browser application. For example, a web application may execute on a server computer and extend a user interface via the device browser to the user of the mobile communication device. The user may view text and graphics presented on the mobile communication device and select control inputs. The user may experience the web application as if it were executing on his or her mobile communication device while in fact it may be executing on a web server or web application server in the network, remote from the mobile communication device.

SUMMARY

In an embodiment, a method of determining location of a wireless communication service subscriber based on a user equipment (UE) self-identifying to a WiFi access point (AP) without establishing a data session between the UE and the WiFi AP is disclosed. The method comprises detecting by a UE a short range radio signal from a WiFi AP and transmitting by the UE an identity of the UE to the WiFi AP. The method further comprises transmitting by the WiFi AP the identity of the UE and a location identity associated with the WiFi AP to a server computer, looking up a communication address of the UE by the server computer based on the identity of the UE in a data store, and transmitting a triggering event message to the UE using the communication address by the server computer, where the triggering event message is transmitted to the UE at least in part over a cellular wireless network, where the triggering event message carries information related to the location identity associated with the WiFi AP. The method further comprises receiving by the UE the triggering event over a cellular wireless communication link and, responsive to the triggering event, executing an application on the UE based on the information related to the location identity carried in the triggering event message.

In another embodiment, a method of wireless communication is disclosed. The method comprises receiving an identity of a user equipment (UE) by a WiFi access point (AP) via a short range radio signal, where the WiFi AP does not establish a data communication session with the UE and transmitting a first message by the WiFi AP to a server computer, where the message comprises the identity of the UE and an identity of a retail store where the WiFi AP is located. The method further comprises receiving the first message by the server computer, responsive to receiving the first message, looking up by the server computer a communication address of the UE based on the identity of the UE and, responsive to receiving the first message, looking up by the server computer a link to a web application associated with the retail store based on the identity of the retail store. The method further comprises building a second message by the server computer, where the second message comprises a link to the web application associated with the retail store and transmitting the second message by the server computer to the UE via a cellular wireless communication link, whereby the UE is enabled to execute the web application associated with the retail store by activating the link in the second message In yet another embodiment, a server computer that determines a location of a wireless communication service subscriber based on a user equipment (UE) self-identifying to a WiFi access point (AP) without establishment of a data session between the UE and the WiFi AP is disclosed. The server computer comprises a processor, a data store, a non-transitory memory, and an application stored in the non-transitory memory. When executed by the processor, the application receives a first message from a WiFi AP comprising an identity of a UE that does not establish a data communication session with the WiFi AP and an identity of a retail store where the WiFi AP is located and looks up a communication address of the UE in the data store based on the identity of the UE in the first message. The application further looks up a link to a web application associated with the retail store where the WiFi AP is located in the data store based on the identity of the retail store in the first message, builds a second message comprising the link to the web application associated with the retail store where the WiFi AP is located, and transmits the second message to the UE via a cellular wireless communication link based on the communication address of the UE, whereby the UE is enabled to execute the web application associated with the retail store where the WiFi AP is located by activating the link in the second message.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
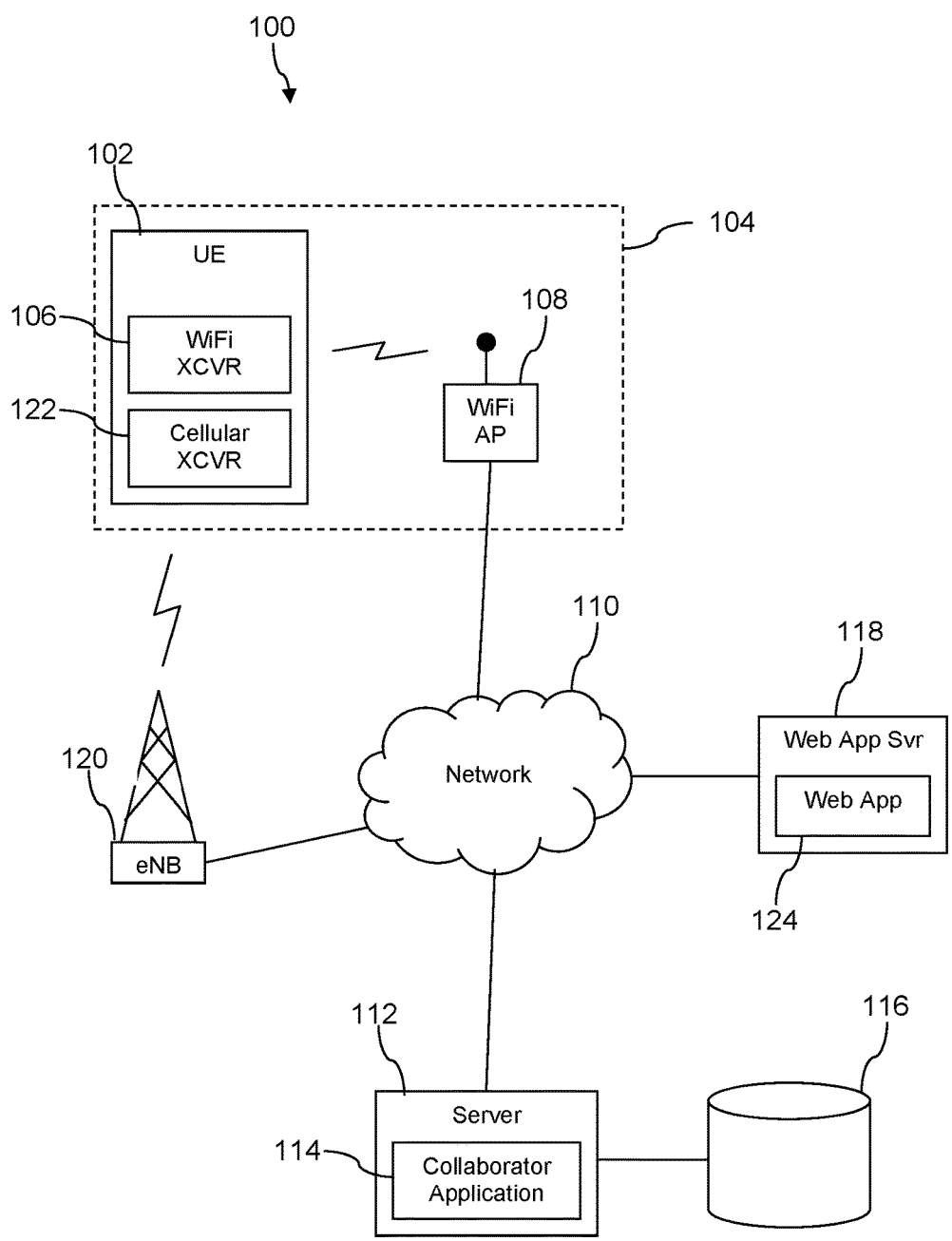
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Retail stores can improve a customer's shopping experience if they know when specific individuals enter their stores. For example, if a retail enterprise knows that Mr. Green has entered one of its stores, it can look up information about Mr. Green's shopping history, Mr. Green's demographics, and Mr. Green's interests and preferences. Based on this information, the retail enterprise may determine that Mr. Green buys dog food about every 3 weeks and it has been just over 3 weeks since he last bought dog food. The retail enterprise may send a notification to Mr. Green's mobile communication device to remind him about buying dog food. As a different example, the retail enterprise may send Mr. Green a coupon for buying a dog toy via his mobile communication device, based on the assumption that Mr. Green is a dog owner, since he regularly buys dog food.

The present disclosure teaches a communication system for determining when a person enters a location and to use that information to enhance the person's experience at that location based on accessing stored information about that person. A WiFi radio transceiver in a user equipment (UE) used by the person provides information identifying the UE to a WiFi access point (AP) at an entrance to the location without establishing a data communication session with the WiFi AP. The WiFi AP may be configured to transmit using low power, whereby it can be expected that only UEs close to the entrance of the store (e.g., UEs associated with users entering the store) will receive the WiFi AP radio signal. An application executing on the UE detects the WiFi AP, and the detection event triggers the application to transmit information identifying the UE to the WiFi AP without establishing a data communication session. While the person enters the location and goes about his or her business, the WiFi AP sends a message to an application server that includes the information identifying the UE as well as information identifying the location. The location may be a store of a retail enterprise. The location may be a government service office such as a post office, a social security administration office, a passport office, a department of motor vehicles office, or another government office. The location may be a sports venue.

An application executing on the application server may use the information identifying the UE to look up a cellular phone number or other information that addresses the UE. The application may further use the information identifying the location to look up a web application or a downloadable mobile application associated with the location. The web application or mobile application may be an application that can provide a communication link between the UE and the location and may be used as a platform for enhancing the user's experience at the location. The application may establish communication with the UE via a cellular radio link with a proximate enhanced node B (eNB) or cell tower using the cellular phone number or other address that uniquely identifies the UE. The application can then trigger the UE to execute either the web application or the downloadable mobile application.

The web application or downloadable mobile application can provide information related to the UE and hence to the user that is germane to his or her interests and/or history. A buying history may be analyzed by the application on the application server to suggest products to purchase. This may help a busy housewife remember to buy milk during her stop at the grocery store on her way home from work. An interest profile may be analyzed by the application on the application server to suggest newly released products that the user of the UE may be interested in. To encourage the user to take a risk and purchase such a new product, the application executing on the application server may create a coupon for the product and transmit it via the cell tower to the UE.

Determining in real-time when a specific customer having a UE enters a business so that useful and personalized information can be pushed to the UE timely—in time for the customer to benefit from the information while shopping and before engaging with a checkout point-of-sale (POS) terminal—has been a severe challenge. Relying on GPS self-location of UEs may not be feasible because leaving GPS receivers on continuously can drain batteries prematurely. Establishing data sessions between UEs and WiFi APs can be time and resource consuming. For example, obtaining a data session may entail the UE getting a radio association to a SSID of the WiFi AP, the UE receiving an IP address from a dynamic host configuration protocol (DHCP) server, and the UE pinging with the IP address to a RADIUS server. The system and method described above can provide the desired useful and personalized information in a timely manner while consuming fewer resources.

While the example above focused on a retail store scenario, the advantages of the system apply more generally. For example, the application executing on the application server may determine that the user of the UE has recently been sent a jury summons, that today is the day designated by the jury summons, and that the UE has just entered the court house. The application executing on the application server may send information on how to find the candidate jurors' waiting room to the user via a cell tower to the UE. The application server may send a link to a web application associated with performing jury duty at the subject court house via an IP notification via the cell tower to the UE. By clicking on the link embedded in the IP notification, the user of the UE can access the web application that provides a map of the court house and indicates where to go to perform jury duty. As another example, the application executing on the application server may determine that the user of the UE has an expiring driver's license and has just entered a department of motor vehicles office where driver's licenses are renewed. The application server may send a link to a web application associated with renewing driver's licenses in an IP notification to the UE of the user. By clicking on the link embedded in the IP notification, the user of the UE can access the web application that provides information on where to wait to renew his or her driver's license, how long the wait is, what documents are required to successfully complete the process, and other information.

Turning now to FIG. 1, a communication system 100 is described. In an embodiment, the system 100 comprises a user equipment (UE) 102, a WiFi access point (AP) 108, a network 110, a server 112, a data store 116, a web application server 118, and an enhanced node B (eNB) 120. The UE 102 comprises a WiFi radio transceiver 106 and a cellular radio transceiver 122. The WiFi AP 108 is positioned at a location 104, for example at an entrance to a retail store, at an entrance to a governmental office, or at an entrance to a sports venue. In a scenario described further hereinafter, the UE 102 is at the location 104 during an interaction with the WiFi AP 108 and with the server 112.

The network 110 comprises one or more public networks, one or more private networks, and/or a combination thereof. The UE 102 may be any of a mobile communication device, a mobile phone, a smart phone, a media player, a personal digital assistant (PDA), a wearable computer, a headset computer, a laptop computer, a notebook computer, or a tablet computer. The eNB 120 may also be referred to as a cell tower or a base transceiver station (BTS). The eNB 120 provides a cellular communication link to the cellular transceiver 122 according to one or more of a long term evolution (LTE) wireless communication protocol, a code division multiple access (CDMA) wireless communication protocol, a global system for mobile communication (GSM) wireless communication protocol, a worldwide interoperability for microwave access (WiMAX) wireless communication protocol, and/or another cellular wireless communication protocol. While FIG. 1 illustrates a single instance of the UE 102, the location 104, the WiFi AP 108, the eNB 120, the web application server 118, the server 112, and the data store 116, it is understood that the system 100 may comprise any number of these entities.

In one use case, a user carrying the UE 102 approaches an entrance of a building at location 104. The WiFi AP 108 may be adjusted to transmit a radio signal at a low power level, for example, a 0.5 milliwatt (mW) power level or less. Alternatively, the WiFi AP 108 may be adjusted to transmit a radio signal at a power level of 1.0 mW or less. When the WiFi transceiver 106 detects the radio signal transmitted by the WiFi AP 108 (which may only occur when the user is within about 15 feet of the WiFi AP 108, because of the low transmitter power of the WiFi AP 108), the UE 102 and/or the WiFi transceiver 106 may transmit information identifying the UE 102 to the WiFi AP 108. This may referred to as the UE 102 self-identifying to the WiFi AP 108. The low power level used by the WiFi AP 108 may result in a short range radio signal, for example a signal that is detectable only over a short distance, for example over a distance of less than about 100 feet, less than about 50 feet, less than about 30 feet, or less than about 15 feet. It is observed that this transmission of information can be completed without the establishment of a data communication session between the UE 102 and the WiFi AP 108 and without the UE 102 authenticating itself to the WiFi AP 108. Additionally, as the user and UE 102 proceed to enter the location 104, the WiFi transceiver 106 is likely to lose contact with the WiFi AP 108, due to the low transmission signal strength of the WiFi AP 108. This eventuality is not a problem as the interaction between the WiFi transceiver 106 and the WiFi AP 108 has provided the desired triggering event. The identifying information may be a media access control (MAC) address of the UE 102. Alternatively, the identifying information may be an electronic serial number (ESN), a mobile equipment identity (MEID), or some other identifying information.

The WiFi AP 108 or an application executing on the WiFi AP 108 may send a message to a collaborator application 114 executing on the server 112 that contains the identity of the UE 102 as well as an identity of the WiFi AP 108, of the location 104, and/or of an enterprise or organization associated with the location 104 (for example, an identity of a chain of hardware stores where the location 104 is one specific store of the chain of hardware stores). The collaborator application 114 looks up a mobile directory number (MDN: i.e., the telephone number of the UE 102) or other address of the UE 102 based on the identity of the UE 102 in the data store 116. The mobile directory number or other address of the UE 102 may be used to look up information about the user of the UE 102 and/or to store and aggregate information about the user of the UE 102 in the data store 116 (for example, aggregating information about the event of the user visiting the location 104 at a specific data and time).

In an embodiment, the collaborator application 114 also looks up a mobile application or a link to the mobile application associated with the location 104 in the data store. The mobile application may be installed on the UE 102 and executed locally. If the mobile application is already installed on the UE 102, the collaborator application 114 may send a message or signal via the eNB 120 to the cellular transceiver 122 to cause the installed mobile application to execute on the UE 102. If the mobile application is not installed on the UE 102, the collaborator application 114 may establish a cellular communication link between the eNB 120 and the cellular transceiver 122, download the mobile application to the UE 102, install the mobile application on the UE 102, and send a message or signal via the eNB 120 to the cellular transceiver 122 to cause the now installed mobile application to execute on the UE 102. Alternatively, the mobile application may be a web application 124 that executes on the web server 118. When the mobile application is a web application 124, the collaborator application 114 may send an IP notification to the UE 102 containing a link to the web application 124. When the UE 102 receives the IP notification, when the user clicks on the link, the web application 124 may be executed on the web application server 118 and extend an interface to the web application 124 to the user via a touchscreen display of the UE 102.

It is contemplated that the mobile application (either locally installed or executed remotely as a web application 124 on the web application server 118) may provide a variety of services and helpful information to the user via the UE 102. The collaborator application 114 may search the data store 116 for information about the user and/or the UE 102 and share that information with the mobile application, for example purchasing history, browsing history, demographics information, and the like. Based on this individualized information, the mobile application may provide reminders, recommendations, cues, and orienting information. The mobile application may provide a map of the location 104. The mobile application may surmise a purpose of the user in entering the location 104 (e.g., fulfill a jury summons, renew a driver's license, enroll for unemployment insurance) and provide information in support of that surmised purpose. The mobile application may provide coupons on the UE 102 based on individualized information about the user.

In an embodiment, the collaborator application 114 performs additional analysis based on individualized information looked up on the user and/or UE 102 in the data store 116. For example, the collaborator application 114 may determine that a mobile advertisement associated with the location 104 (e.g., a mobile advertisement associated with the chain of hardware stores to which the location 104 belongs) was clicked on by the user when browsing content on the UE 102 earlier that day. The collaborator application 114 can provide a report to an enterprise associated with the location 104 that links mobile ad experience with visiting the location 104. The collaborator application 114 may be able to determine a rate at which ad click throughs for the enterprise's mobile ads lead to subsequent visits at one of the enterprise's locations 104.

Figure 2:
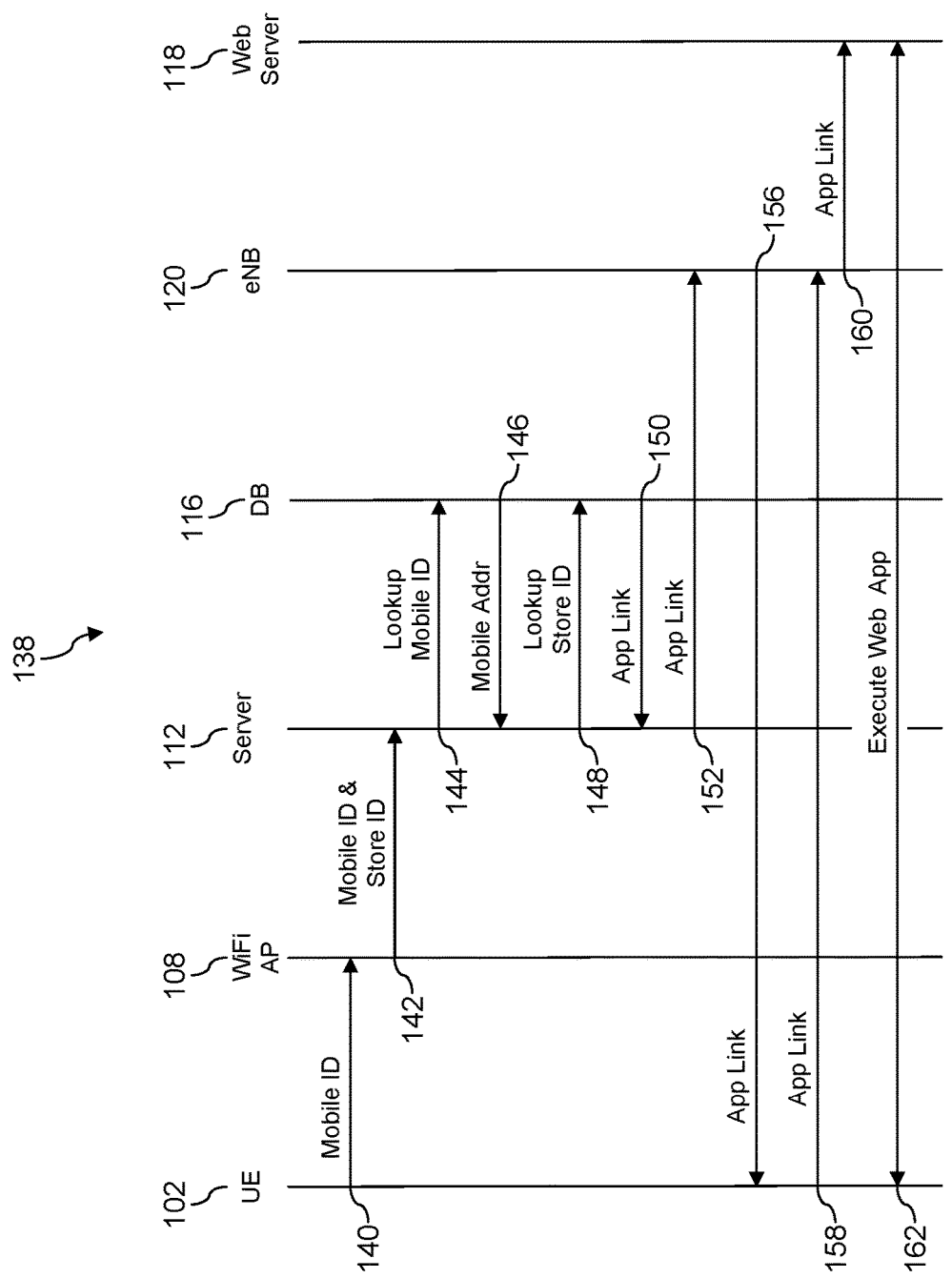
FIG. 2 is a message sequence diagram according to an embodiment of the disclosure.

Turning now to FIG. 2, a message sequence 138 is described. The UE 102 sends a mobile identity signal 140 to the WiFi AP 108. The WiFi AP 108 sends a message 142 containing the mobile identity and an identity of the location 104 (e.g., a store identity) to the server 112 and/or the collaborator application 114. The server 112 and/or the collaborator application 114 sends a lookup request message 144 to the data store 116 with the mobile identity as a look-up key. The data store 116 sends a lookup response message 146 containing a mobile address associated with the UE 102, for example a mobile directory number (MDN: i.e., the phone number of the UE 102) or an IP address of the UE 102, to the server 112 and/or the collaborator application 114. The server 112 and/or the collaborator application 114 sends a lookup request message 148 to the data store 116 with the identity of the location (e.g., a store identity) as a lookup key. The data store 116 sends a lookup response message 150 containing information about a mobile application, for example a link to the web application 124 or a reference to a file for downloading the mobile application (e.g., a java archive file or some other file), to the server 112 and/or the collaborator application 114.

The server 112 and/or the collaborator application 114 may send a message 152 containing the information about the mobile application to the eNB 120. The eNB 120 may send a message 156 containing the information about the mobile application to the UE 102. The UE 102 may use the information to install the mobile application on the UE 102 and to execute the mobile application. Alternatively, the UE 102 may execute a link to the web application 124 by sending a message 158 to the eNB 120, and the eNB 120 sending a message 160 to the web server 118, whereby the link is executed (i.e., the address or reference contained in the link is reached and content identified by that reference is returned and/or executed). By executing the link, the UE 102 may execute the web application 124 via a communication session 162 between the UE 102 and the web server 118 linked by the eNB 120.

Figure 3:
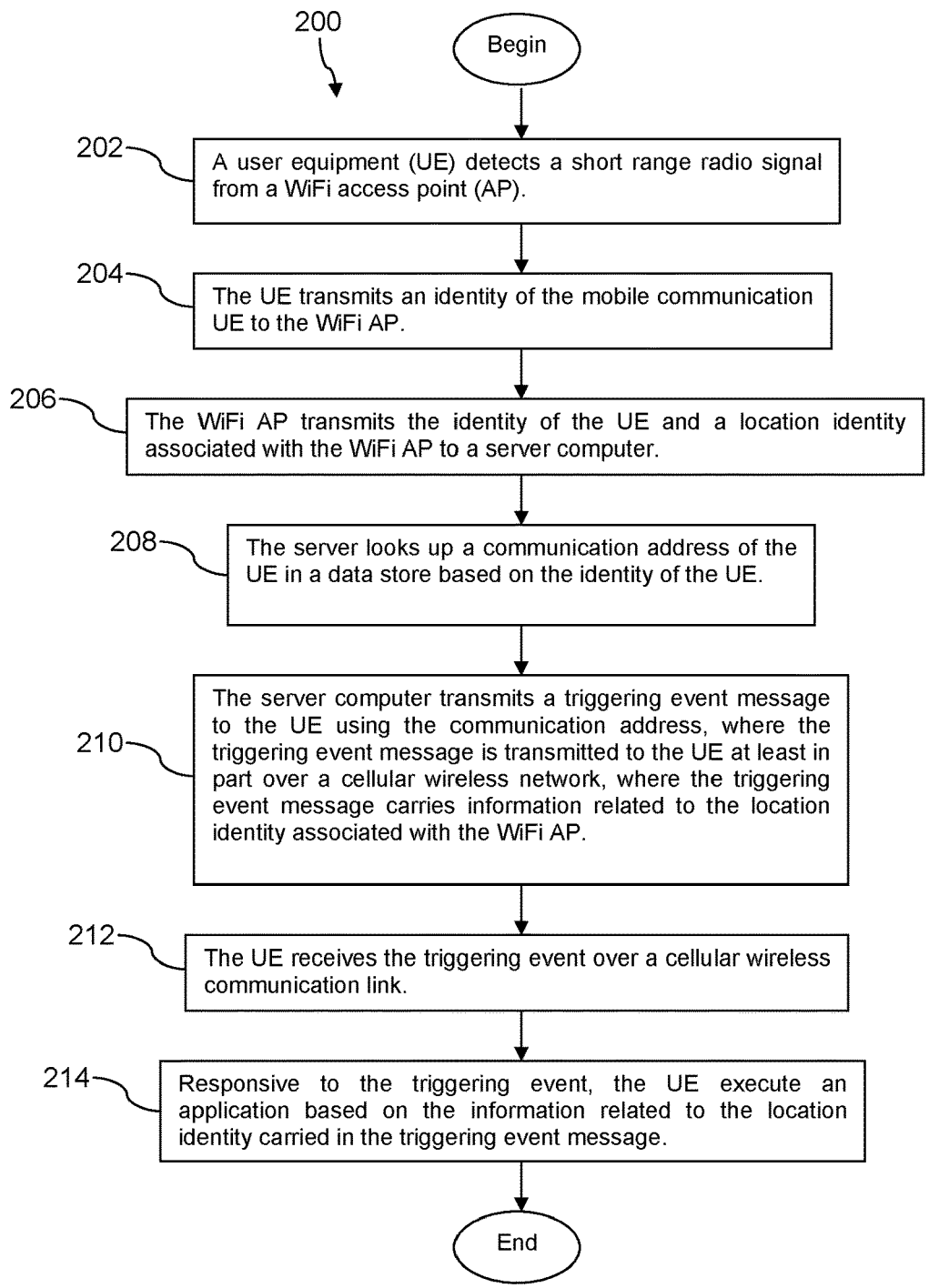
FIG. 3 is a flow chart of a method according to an embodiment of the disclosure.

Turning now to FIG. 3, a method 200 is described. In an embodiment, the method 200 promotes determining location of a wireless communication service subscriber based on a user equipment (UE) self-identifying to a WiFi access point (AP) without establishing a data session between the UE and the WiFi AP. At block 202, a mobile communication device detects a short range radio signal from a WiFi access point (AP). For example, as a user carrying the UE 102 approaches the WiFi AP 108, the low power radio signal emitted by the AP 108 is received by the WiFi transceiver 106 when the user is close enough to the AP 108. At block 204, the mobile communication device transmits an identity of the mobile communication device to the WiFi AP. The WiFi transceiver 106 sends a radio signal that comprises an identity of the UE 102, for example a MEID, an ESN, a MAC address, or another identification. Note that the UE 102 and/or WiFi transceiver 106 can convey its identity to the WiFi AP 108 in block 204 without establishing a data connection and without authenticating itself with the WiFi AP 108. Also, the transmission by the UE 102 of its identity in block 204 is triggered by the detection in block 202 of the short range radio signal from the WiFi AP. At block 206, the WiFi AP transmits the identity of the mobile communication device and a location identity associated with the WiFi AP to a server computer. For example, the WiFi AP 108 sends a message containing the identifying information from the UE 102 and the location identifying information to the server 112. The location identity may be a unique identity of the location 104 or may specify a collective identity, for example the identity of a chain of retail stores.

At block 208, the server computer looks up a communication address of the mobile communication device based on the identity of the mobile communication device in a data store. For example, the server 112 looks up a MDN of the UE 102 (i.e., the phone number of the UE 102) in the data store 116 based on the information in the message sent by the WiFi AP 108. The server 112 may further use the identity of the location 104 to identify a mobile application associated with the location 104. At block 210, the server computer transmits a triggering event message to the mobile communication device using the communication address, where the triggering event message is transmitted to the mobile communication device at least in part over a cellular wireless network and where the triggering event message carries information related to the location identity associated with the WiFi AP.

At block 212, the mobile communication device receives the triggering event over a cellular wireless communication link. In response to receiving the triggering event, the UE 102 may download the mobile application, unless the mobile application is already installed. At block 214, responsive to the triggering event, the mobile communication device executes an application based on the information related to the location identity carried in the triggering event message. If the application is installed locally, the UE 102 may execute the mobile application. Alternatively, if the application is a web application, the UE 102 may follow a link to the web application 124 and cause it to be executed on the web application server 118.

Figure 4:
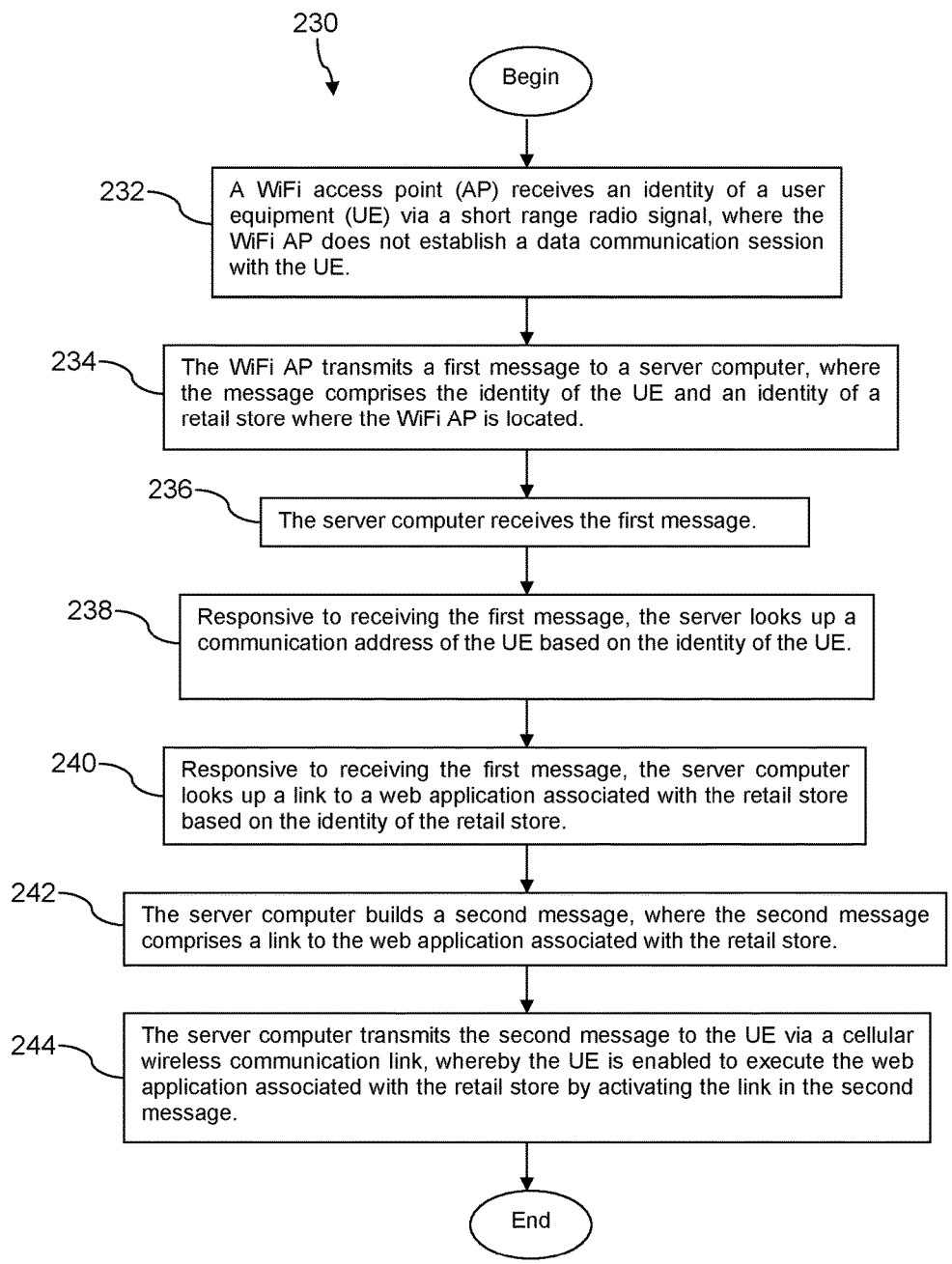
FIG. 4 is a flow chart of another method according to an embodiment of the disclosure.

Turning now to FIG. 4, a method 230 is described. At block 232, a WiFi AP receives an identity of a mobile communication device via a short range radio signal, where the WiFi AP does not establish a data communication session with the mobile communication device. At block 234, the WiFi AP transmits a first message to a server computer, where the message comprises the identity of the mobile communication device and an identity of a retail store where the WiFi AP is located. At block 236, the server computer receives the first message. At block 238, responsive to receiving the first message, the server computer looks-up a communication address of the mobile communication device based on the identity of the mobile communication device. At block 240, responsive to receiving the first message, the server computer looks-up a link to a web application associated with the retail store based on the identity of the retail store. At block 242, the server computer builds a second message, where the second message comprises a link to the web application associated with the retail store. At block 244, the server computer transmits the second message to the mobile communication device via a cellular wireless communication link, whereby the mobile communication device is enabled to execute the web application associated with the retail store by activating the link in the second message.

Figure 5:
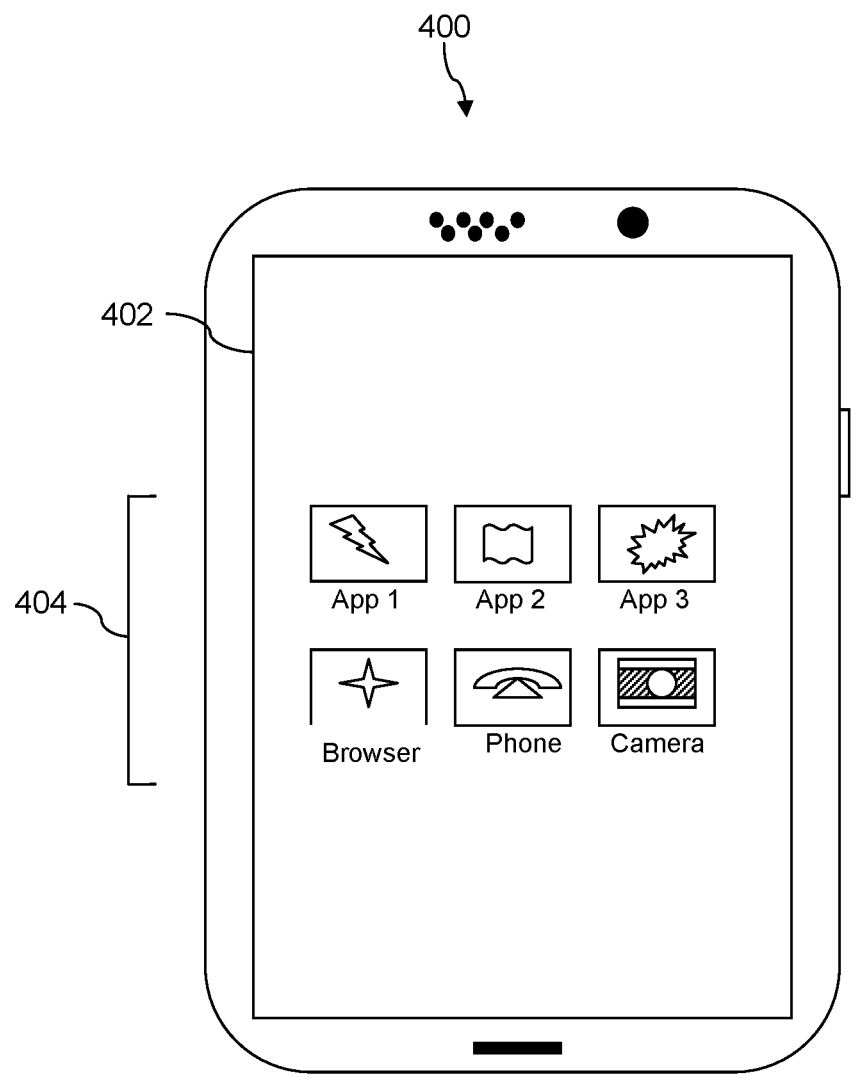
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
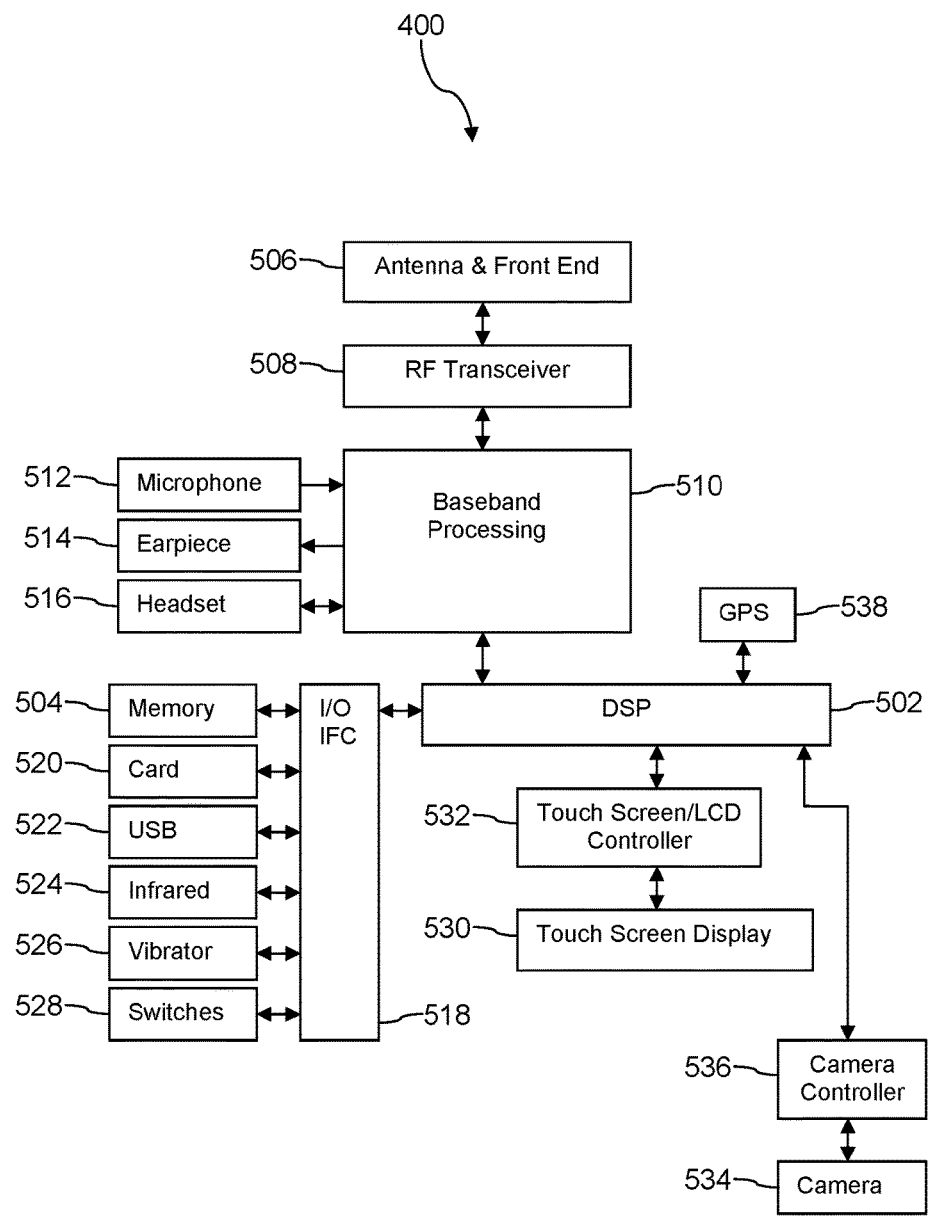
FIG. 6 is a block diagram of a hardware architecture of a mobile communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
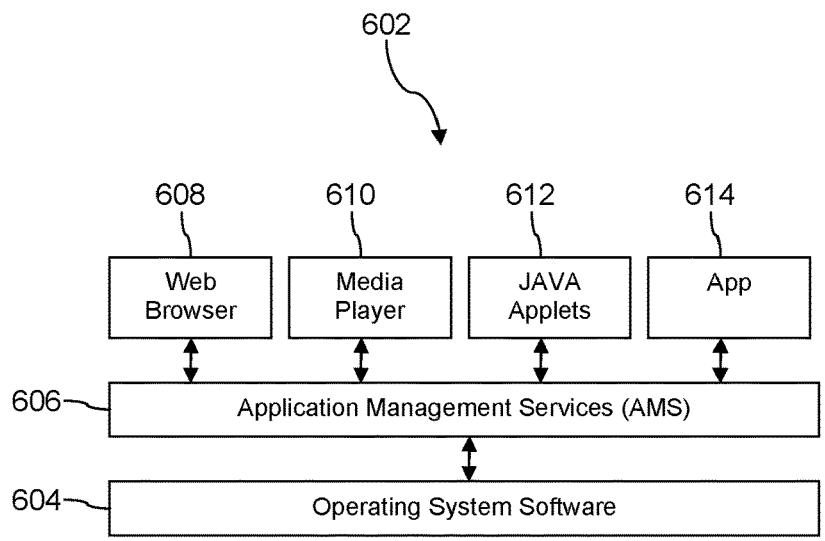
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. In an embodiment, a third party application 614 may be installed on the mobile communication device 400. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

The third party application 614 may be dynamically downloaded and installed during a first time that the mobile communication device 400 enters the retail store 104 (e.g., any of a plurality of retails stores associated with a particular enterprise) and may be activated on subsequent entries into the retail store 104. Alternatively, the third party application 614 may be installed in another way (e.g., the user elects to install the application 614, for example to obtain coupons or other desirable features provided via the application 614).

Figure 7B:
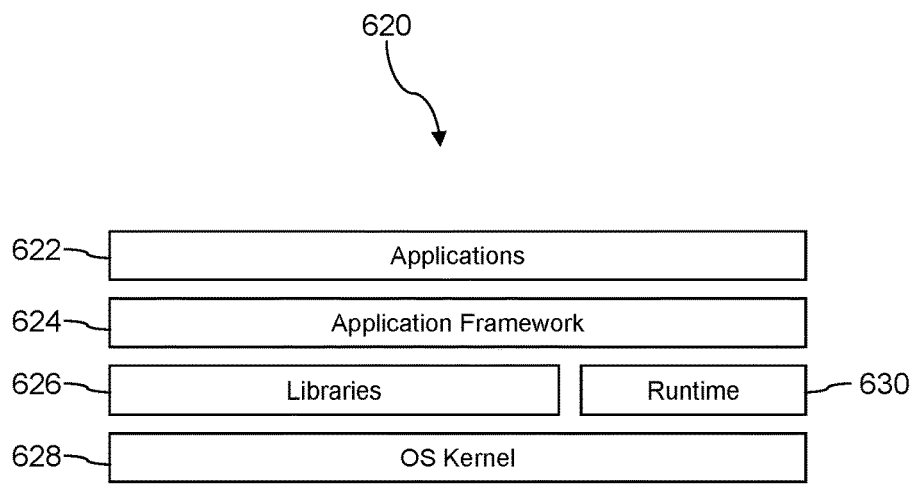
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
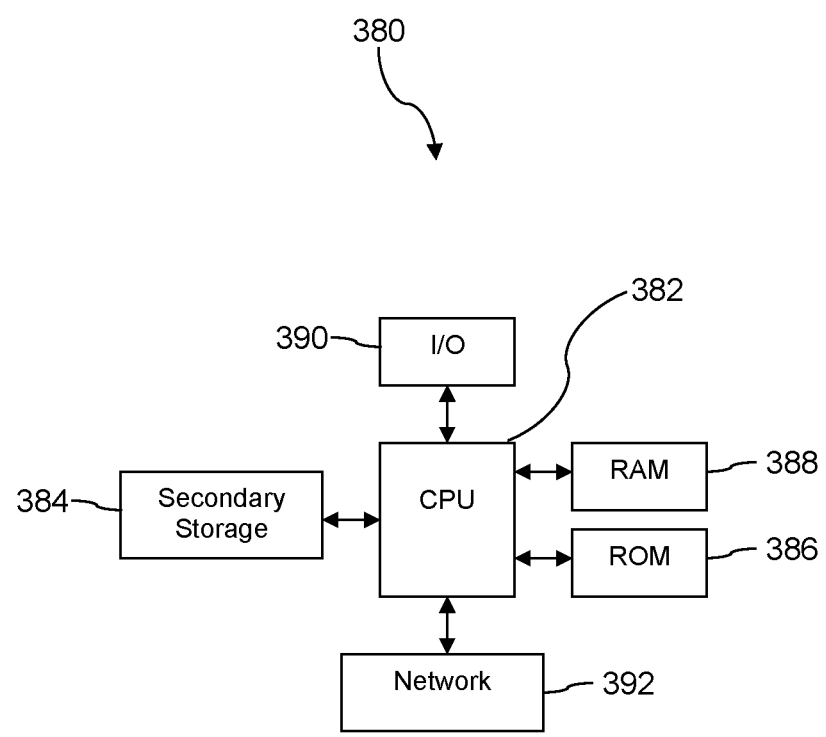
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of wireless communication, comprising:
   receiving an identity of a user equipment (UE) by a WiFi access point (AP) via a short range radio signal, where the WiFi AP does not establish a data communication session with the UE;
   transmitting a first message by the WiFi AP to a server computer, where the message comprises the identity of the UE and an identity of a retail store where the WiFi AP is located;
   receiving the first message by the server computer;
   responsive to receiving the first message, looking up, by the server computer, a communication address of the UE based on the identity of the UE;
   responsive to receiving the first message, looking up, by the server computer, a link to a web application associated with the retail store based on the identity of the retail store;
   building a second message by the server computer, where the second message comprises a link to the web application associated with the retail store; and
   transmitting the second message by the server computer to the UE via a cellular wireless communication link, whereby the UE is enabled to execute the web application associated with the retail store by activating the link in the second message.

2. The method of claim 1, wherein the cellular wireless communication link is established according to one of a long term evolution (LTE), a code division multiple access (CDMA), a global system for mobile communications (GSM), or a worldwide interoperability for microwave access (WiMAX) wireless communication protocol.

3. The method of claim 1, wherein the second message comprises an IP notification.

4. The method of claim 1, further comprising transmitting a WiFi signal by the WiFi AP with a signal power level of less than about 1 milliwatt (mW).

* * * * *